United States Patent [19]

Seita et al.

[11] 4,108,804
[45] Aug. 22, 1978

[54] PROCESS FOR PREPARATION OF CHROMATOGRAPHY SOLID SUPPORTS COMPRISING A NUCLEIC ACID BASE-EPOXY GROUP CONTAINING POROUS GEL

[76] Inventors: Toru Seita; Akihiko Shimizu; Yoshio Kato; Tsutomu Hashimoto, all of Shin-nanyo, Japan

[21] Appl. No.: 745,767

[22] Filed: Nov. 29, 1976

[30] Foreign Application Priority Data

Dec. 23, 1975 [JP] Japan .................................. 50-152860
Dec. 27, 1975 [JP] Japan .................................. 51-157879

[51] Int. Cl.$^2$ ............................................. C08L 5/00
[52] U.S. Cl. ...................................... 521/121; 195/63; 195/68; 210/31 C; 260/8; 260/112 R; 260/9; 521/123; 521/178

[58] Field of Search ................. 260/9, 8, 112 R, 2.5 R, 260/2.5 EP; 210/31 C; 195/63, 68

[56] References Cited

U.S. PATENT DOCUMENTS

| | | | |
|---|---|---|---|
| 3,806,417 | 4/1974 | Beaucamp et al. | 260/8 |
| 3,917,527 | 11/1975 | Shaltiel | 210/31 C |
| 3,960,720 | 6/1976 | Porath | 210/31 C |
| 3,969,287 | 7/1976 | Jaworek et al. | 260/8 |
| 4,011,205 | 3/1977 | Dean et al. | 260/112 R |

*Primary Examiner*—Edward M. Woodberry
*Attorney, Agent, or Firm*—Oblon, Fisher, Spivak, McClelland & Maier

[57] ABSTRACT

A chromatography solid support is prepared by reacting a nucleic acid base, a related compound thereof or a mixture thereof with an epoxy group-containing porous gel in a solvent in the presence of a carbonate.

9 Claims, 8 Drawing Figures

PROCESS FOR PREPARATION OF CHROMATOGRAPHY SOLID SUPPORTS COMPRISING A NUCLEIC ACID BASE-EPOXY GROUP CONTAINING POROUS GEL

BACKGROUND OF THE INVENTION

1. Field of the Invention

This invention relates to chromatography solid supports containing a nucleic acid base and/or a related compound thereof. The present invention also relates to a method for quickly and simply separating nucleic acid related compounds by using the chromatography solid support which has an excellent separation capacity.

2. Description of the Prior Art

The specificity of a nucleic acid is due to the mutual interaction of the nucleic acid bases constituting the nucleic acid. Accordingly, if the differences in the intensities of these mutual interactions are utilized, it will be possible to separate the constituent units of nucleic acids, such as nucleic acid bases, nucleosides, nucleotides and oligonucleotides.

In fact, various nucleic acid base-containing resins have heretofore been prepared based upon this concept. For example, the following resins are known:

(1) Polymers of N-vinyl and N-methacryloyloxyethyl derivatives of nucleic acid bases [Makromol Chem., 134, 305 (1970)].

(2) Amberlite type resins containing adenosine and guanosine groups [Biochim, Biophys, Acta., 80, 669 (1964)].

(3) Cellulose resins having a guanine structure [Europ. Polymer, J., 3, 187 (1967)].

(4) Polymers formed by introducing a nucleic acid base into a styrene-glycidyl methacrylate copolymer [Nikka, 23rd annual meeting, N-02432 (1970), Tokyo].

Various difficulties are encountered when these resins are used as chromatography solid supports. Moreover, their separation capacity is low. When the solvent used is water, their separation capacity is extremely poor and they cannot be used at all.

The present inventors have attempted to solve these problems and have found that when a carbonate is introduced into an epoxy group-containing porous gel, a nucleic acid base and/or a related compound thereof can be bonded easily to the gel. Furthermore, this porous gel containing a nucleic acid base and/or a related compound thereof has a good separation capacity and an excellent mechanical strength. Thus, it is excellent for use as a chromatography solid support for separation of nucleic acid related compounds.

A method for introducing a nucleic acid base into an epoxy group-containing polymer which uses NaH is known. In this method, the base polymer is not porous but rather is a powdery polymer obtained by solution polymerization. Accordingly, the polymer prepared in this method cannot be used as a solid support for liquid chromatography. Moreover, since NaH is used in the production process, disadvantageous handling problems are involved for industrial use of the method.

SUMMARY OF THE INVENTION

Accordingly, it is an object of this invention to provide a process for preparing a chromatography solid support containing a nucleic acid base for use in separating nucleic acid related compounds without the above-described disadvantages.

It is another object of this invention to provide a method for introducing a nucleic acid base into an epoxy-containing polymer.

It is also an object of this invention to provide a method for separating nucleic acid related compounds by chromatography.

It is a further object of this invention to provide a solid support for use in chromatography of nucleic acids and related compounds.

Briefly, these and other objects of this invention as hereinafter will become clear have been attained by providing a process which comprises reacting a nucleic acid base and/or a related compound thereof with an epoxy group-containing porous gel in a solvent in the presence of a carbonate. The resulting porous gel not only can be used as a chromatography solid support, but is fundamentally different from conventional resins containing a nucleic acid base and/or a related compound thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
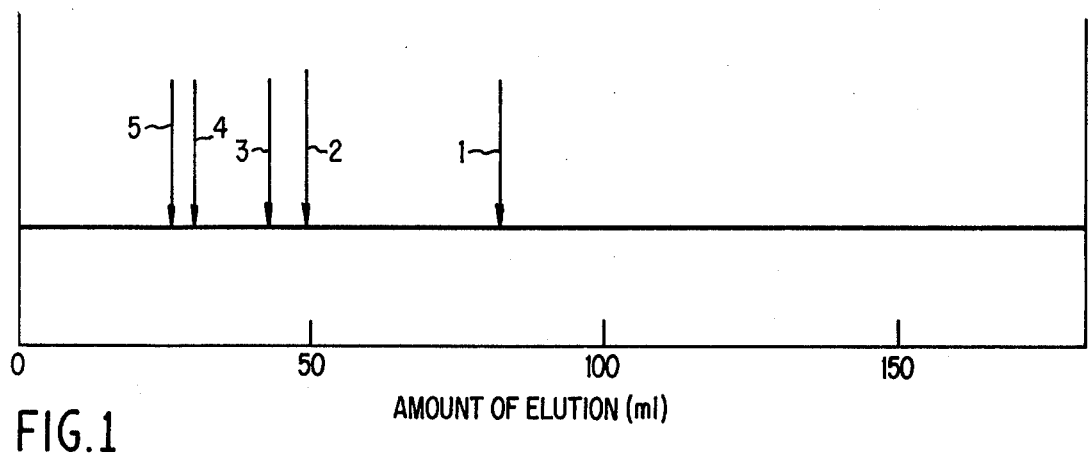
FIG. 1 illustrates the elution positions of nucleoside compounds in chromatography using a gel of the present invention.

In these figures, the nucleosides are as follows:
0. point of injection
1. adenosine
2. guanosine
3. thymidine
4. uridine
5. cytidine
6. guanine
7. guanylic acid

DETAILED DESCRIPTION OF THE PREFERRED EMBODIMENTS

In the present invention, it is important that the polymer used in the reaction be an epoxy group-containing porous gel. Suitable epoxy group-containing porous gels include porous gels composed of homopolymers and copolymers of epoxy group-containing monomers such glycidyl methacrylate, glycidyl acrylate, glycidyl allyl ether and 1,2-epoxystrene; copolymers of these epoxy group-containing monomers with styrene, substituted styrenes such as α-methylstyrene, acrylic and methacrylic acids or esters thereof, acrylonitrile, or substituted acrylonitriles such as methacrylonitrile; and copolymers comprising at least one of the foregoing epoxy group-containing monomers and at least one monomer containing at least two unsaturated groups, i.e., cross-linking agents, such as divinyl benzene and ethylene glycol diacrylate. Moreover, polymers formed by grafting epoxy group-containing monomers such as those mentioned above to silica gel, alumina and the like can also be used. In summary, any porous gel containing epoxy groups can be used in the present invention.

The gel used should be prepared by suspension polymerization and its pore size should be less than 1μm, preferably 10 to 2000 Å, more preferably 50 to 500Å. The crosslinking density should be 5 to 30 mole %, and the gel size 2 to 200 μm, preferably 5 to 50μm.

Suitable nucleic acid bases and related compounds for use in the reaction include, for example, adenine, guanine, thymine, uracil, cytosine, theophylline, hypoxanthine, 6-mercaptopurine and 5-halopyrimidine.

The preparation of the gel according to the present invention is very simple. The intended gel can be obtained easily by reacting the nucleic acid base and/or related compound thereof with the epoxy group-containing gel in a solvent in the presence of a carbonate while heating. Suitable solvents include polar solvents such as N,N-dimethylformamide, N,N-dimethylacetamide, N,N-dimethylsulfoxide or a mixture thereof. Anhydrous alkali metal carbonates such as anhydrous sodium carbonate and anhydrous potassium carbonate are preferably used as the carbonate. The reaction temperature should be 50° to 200° C., preferably 70° to 100° C. The reaction time is not critical and varies considerably depending on the desired introduction ratio (i.e., the proportion of nucleic acid base on the polymer backbone) of the nucleic acid base and/or its related compound; but, in general, good results are obtained when the reaction is conducted for 5 to 30 hours.

The foregoing reaction of the nucleic acid base or its related compound commonly includes two methods; first a method in which one nucleic acid base or related compound is introduced; and second, a method in which at least two nucleic acid bases or related compounds are introduced. These two methods will now be described in detail.

When a porous gel containing one nucleic acid base or related compound is prepared, the nucleic acid base or related compound is reacted with the epoxy group-containing porous gel. The introduction ratio can be controlled by adjusting the molar ratio of the reactants and the reaction time.

When a porous gel containing at least two nucleic acid bases or related compounds is prepared, the following three methods may be adopted. (1) A mixture of at least two nucleic acid bases or related compounds is reacted with the epoxy group-containing porous gel. The introduction ratio can be controlled by adjusting the molar ratio of the reactants. However, since the reactants have different reactivities, it is difficult to freely control the introduction ratio. (2) One nucleic acid base or related compound is first reacted with the epoxy group-containing porous gel. The second reactant is then added to the reaction product without withdrawing the reaction product from the reaction vessel and the reaction is carried out. The introduction ratio can be controlled by adjusting the molar ratio of the reactants. It is preferred that the second nucleic acid base or related compound be added after the first reaction has been completed. (3) The reaction product obtained after the first stage of the method (2) is withdrawn from the reaction vessel, and the second nucleic acid base or related compound is then reacted with the reaction product. The introduction ratio can be controlled by adjusting the reaction time or the molar ratio of the reactants.

The product of the present invention can be prepared according to any of the foregoing methods. When at least two nucleic acid bases or related compounds are reacted with an epoxy group-containing porous gel, the suitable method should be chosen in view of the reactivities of the respective components.

The amount of the nucleic acid base or its related compound to be used should be 0.4 to 3 equivalents relative to the number of epoxy groups in the porous gel. The carbonate should be present in an amount of 1 to 30 mole % based on the number of epoxy groups in the porous gel.

The method of the present invention includes separating nucleic acid related compounds with high efficiency by using the chromatography solid support of the invention, which has a very high separation capacity; is swollen only with difficulty; is capable of performing separations even with use of water alone as the chromatography solvent; does not suffer from dissolution of the polymers and nucleic acid bases and/or related compounds thereof in the support into the chromatography solvent; and has excellent mechanical properties. Thus, the essential feature of the present invention resides in the use of a chromatography solid support formed by bonding a nucleic acid base and/or related compound thereof to an epoxy group-containing porous gel.

A support formed from a crosslinked porous gel is excellent in comparison with a support formed from an uncrosslinked gel with respect to its volume contraction and the like when used for liquid chromatography. Moreover, the separation capacity of a support formed from a porous gel is much higher than that of a support formed from a powdery polymer when used for liquid chromatography. The nucleic acid base-containing porous gel that is used in the method of the present invention has a much higher separation capacity than that of a gel to which a nucleic acid base or related compound in not bonded. In addition, since the support that is used in the method of the present invention is a crosslinked gel having a large surface area, the content of the nucleic acid base or related compound can be remarkably high.

For liquid chromatography, a higher separation capacity can be attained by using a support having a smaller support size and a spherical shape, the latter providing a higher separation capacity than an amorphous shape. Accordingly, for the present invention, it is also preferred to use a fine spherical support if it is desired to attain a high separation capacity.

Even distilled water can be effectually used as the solvent for the method of the present invention. Accordingly, the present invention provides excellent effects when samples which are readily decomposed by alkalis or acids are separated. Moreover, when true values are not obtained under alkaline or acidic conditions in analyzing nucleic acid related compounds by liquid chromatography, the support of the present invention can be effectively used and is highly attractive. Accordingly, the applicability of the present invention is very broad.

Having generally described this invention, a further understanding can be obtained by reference to certain specific examples which are provided herein for purposes of illustration only and are not intended to be limiting unless otherwise specified.

EXAMPLE 1

A reaction vessel was charged with thymine (50 parts), crosslinked porous polyglycidyl methacrylate (pore size of about 100 A) (40 parts) and N,N-dimethylformamide (300 parts). Anhydrous potassium carbonate (3 parts) was added thereto. Air in the reaction vessel was replaced by nitrogen gas, and the reaction was carried out at 85° C for 24 hours under agitation. The reaction mixture was heterogeneous throughout the reaction. After completion of the reaction, the reaction mixture was cooled to room temperature, and the product was collected by filtration.

The collected product was washed sufficiently with N,N-dimethylformamide to remove unreacted thymine and then washed with methanol and dried in vacuo.

Infrared absorptions due to the ester linkage and thymine were observed at 1730 cm$^{-1}$ and 1670 cm$^{-1}$, respectively. As a result of an elementary analysis, it was found that the introduction ratio was 40 mole % based on the number of epoxy groups in the starting porous gel.

EXAMPLE 2

A reaction vessel was charged with adenine (50 parts), crosslinked porous polyglycidyl methacrylate (pore size of about 100 A) (35 parts) and N,N-dimethylformamide (300 parts). Anhydrous potassium carbonate (3 parts) was added thereto. The reaction and post treatment were carried out in the same manner as in Example 1. Infrared absorption due to the ester linkage was observed at 1730 cm$^{-1}$ and due to adenine was observed at 1670 and 1630 cm$^{-1}$. The introduction ratio was 45 mole % based on the number of epoxy groups in the starting gel.

EXAMPLE 3

A reaction vessel was charged with theophylline (50 parts), crosslinked porous polyglycidyl methacrylate (pore size of about 100 A) (30 parts) and N,N-dimethylformamide (300 parts). Anhydrous potassium carbonate (3 parts) was added thereto. The reaction and post treatment were carried out in the same manner as in Example 1. The introduction ratio was 58 mole % based on the number of epoxy groups in the starting gel.

EXAMPLE 4

A reaction vessel was charged with theophylline (25 parts), crosslinked porous polyglycidyl methacrylate (pore size of about 100 A) (30 parts) and N,N-dimethylformamide (180 parts). Anhydrous potassium carbonate (3 parts) was added thereto. Reaction was carried out at 85° C for 24 hours under agitation. Thymine (25 parts) and N,N-dimethylformamide (100 parts) were then added to the reaction vessel, and the reaction was conducted at 85° C for 24 hours.

The reaction product was collected by filtration and was washed sufficiently with N,N-dimethylformamide. The product was then washed with methanol and dried in vacuo.

Infrared absorptions due to the ester linkage, due to theophylline and due to thymine were observed at 1730 cm$^{-1}$, 1715 –1700 cm$^{-1}$ and 1670 cm$^{-1}$, respectively. As a result of an elementary analysis, it was found that the introduction ratios of theophylline and thymine were 28 mole % and 21 mole %, respectively, based on the number of epoxy groups in the starting porous gel.

EXAMPLE 5

A reaction vessel was charged with a glycidylmethacrylate-grafted porous gel (grafting ratio = 45%) (20 parts), thymine (40 parts) and N,N-dimethylformamide (300 parts). Anhydrous potassium carbonate was added thereto. The reaction and post treatment were carried out in the same manner as in Example 1. The introduction ratio was 32 mole % based on the number of epoxy groups in the starting gel.

EXAMPLE 6

Figure 3:
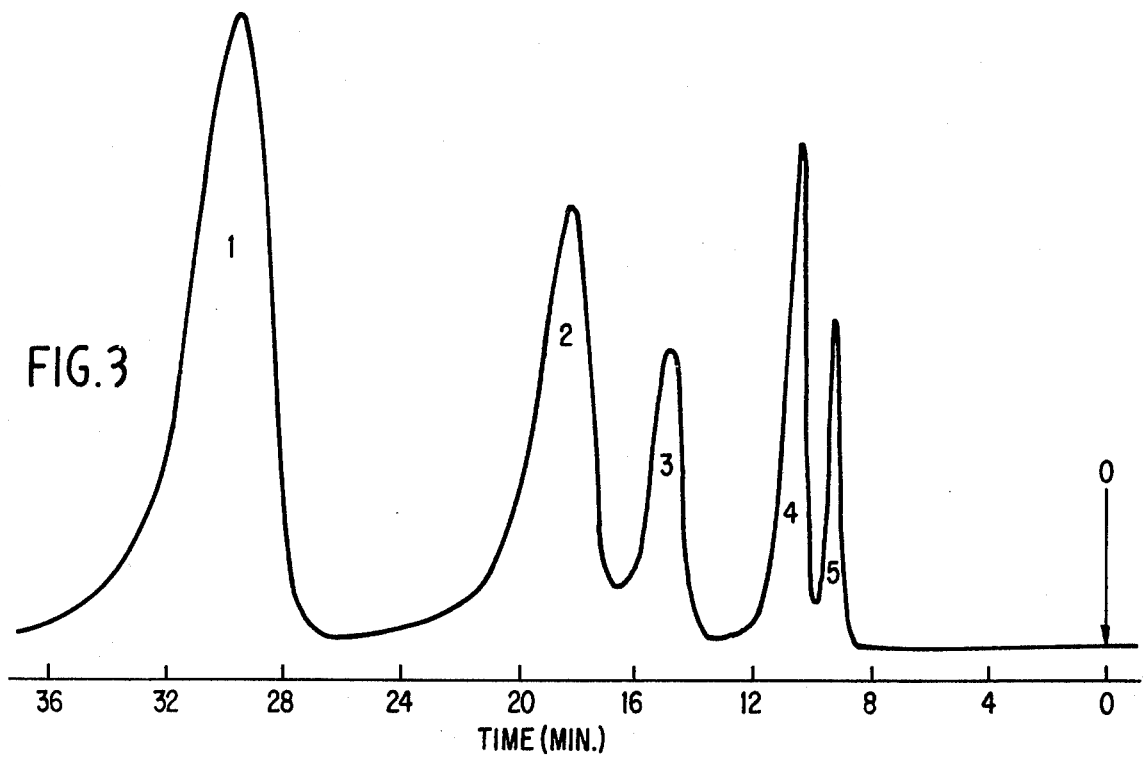
FIG. 3 is a chromatogram of a nucleoside compound mixture obtained by using a gel of the present invention.

A nucleoside mixture was separated by HLC-802U (trademark for a liquid chromatography apparatus manufactured by Toyo Soda Kogyo Kabushiki Kaisha) using the thymine-containing porous gel prepared in Example 1 under the following conditions to obtain the results shown in FIG. 3.

Measurement Conditions

Detector: ultraviolet absorption detector (254 mm)
Solvent: water
Pressure loss: 20 kg/cm$^2$
Temperature: room temperature

Test 1

The thymine-containing porous gel prepared by the process of Example 1 was packed in a column having an inner diameter of 0.75 cm and a length of 61 cm. The separation capacity was tested under the conditions described below to obtain the results shown in FIG. 1.

Figure 2:
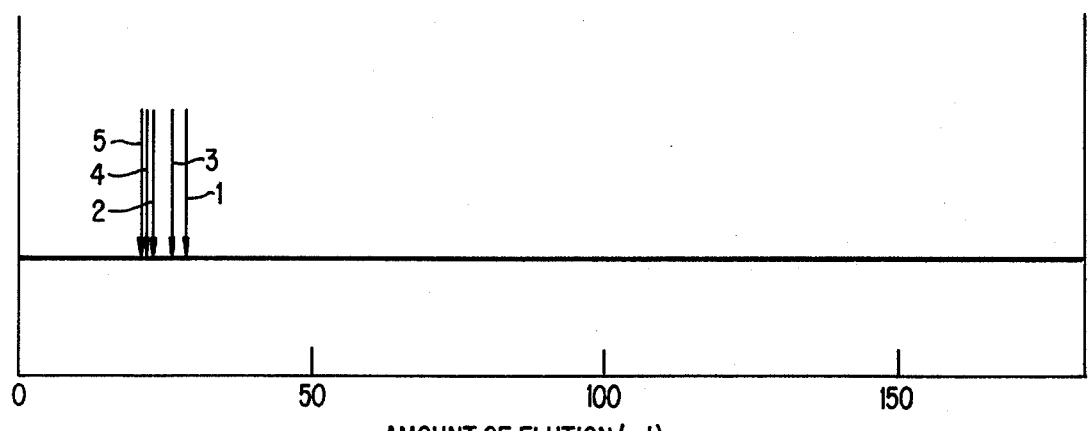
FIG. 2 illustrates the elution positions of nucleoside compounds in chromatography using a conventional comparative gel.

For comparison, the separation capacity of a thymine-free support was similarly tested to obtain the results shown in FIG. 2.

Measurement Conditions

Apparatus: HLC-802UR (the trademark for a chromatography device manufactured by Toyo Soda Kogyo K.K.)
Detector: ultraviolet absorption detector (wavelength) = 254 nm)
Solvent: water
Flow rate: 3.1 ml/min
Pressure loss: 20 kg.cm$^2$
Temperature: room temperature As can be seen from the results obtained, the thymine-containing gel has a very high separation capacity while separation was impossible using the gel containing no bonded thymine.

Test 2

Using the gel obtained in Example 1, a nucleoside mixture was separated under the same conditions as in Example 1 to obtain the results shown in FIG. 3.

Test 3

Figure 4:
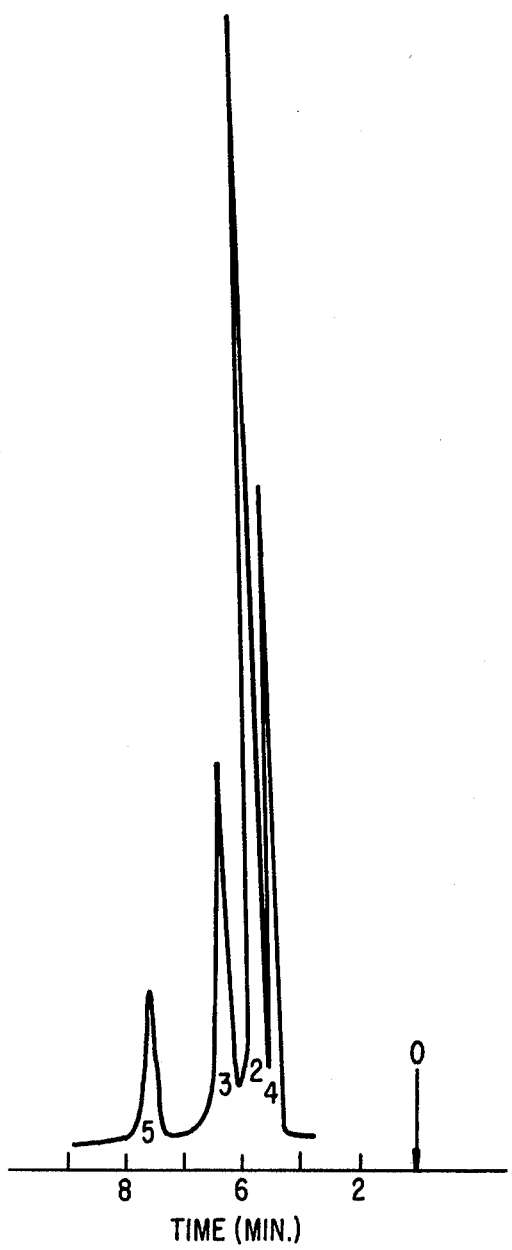
FIG. 4 is a chromatogram of a nucleoside compound mixture obtained by using a gel of the present invention.

A nucleoside mixture was separated under the same conditions as in Example 1 except that 0.01 N aqueous ammonia was used as the solvent instead of water. The results obtained are shown in FIG. 4.

Test 4

Figure 7:
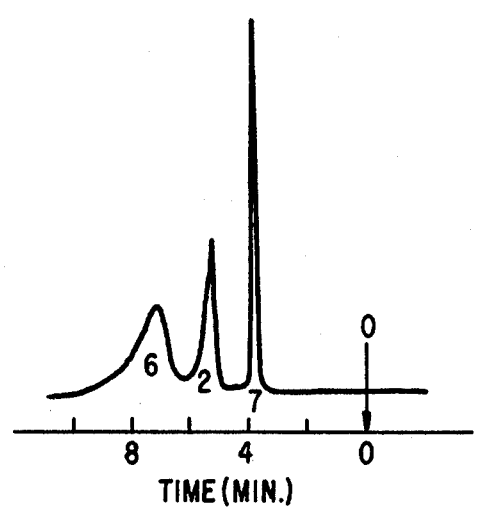
FIG. 7 is a chromatogram of a guanine derivative mixture obtained by using a gel of the present invention.
Figure 5:
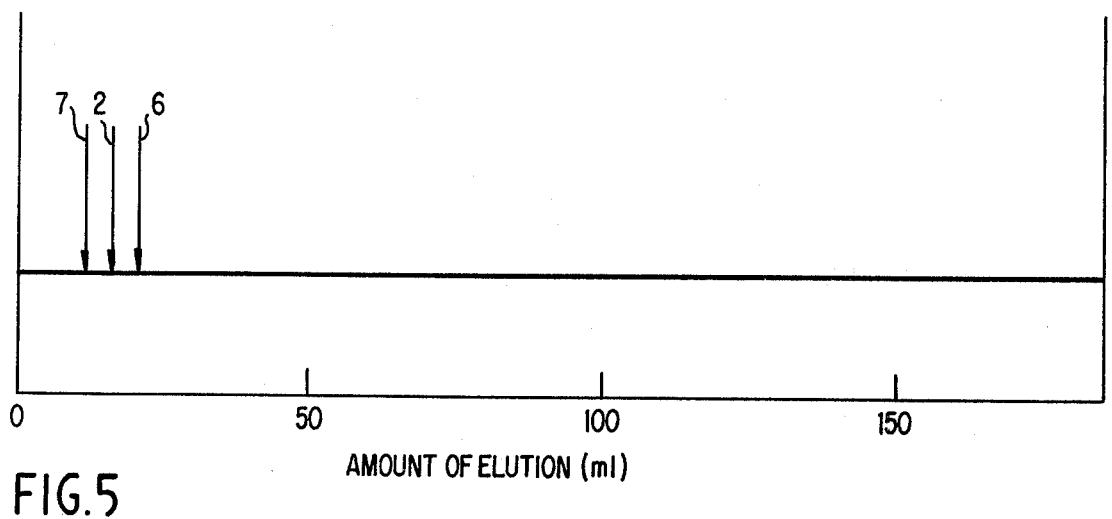
FIG. 5 illustrates the elution positions of guanine derivatives in chromatography using a gel of the present invention.
Figure 6:
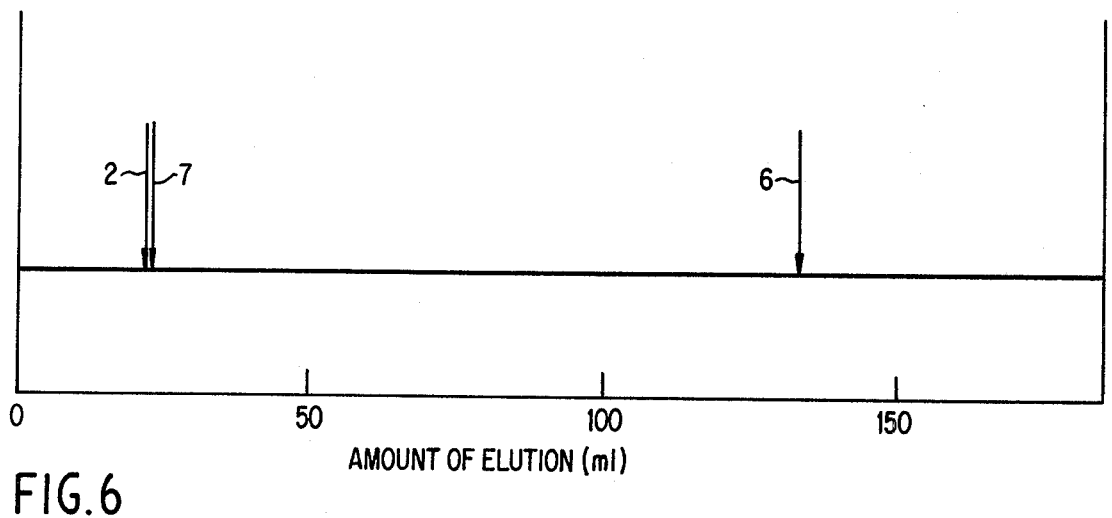
FIG. 6 illustrates the elution positions of guanine derivatives in chromatography using a comparative gel.

A guanine derivative was separated under the same conditions as in Example 3 to obtain the results shown in FIG. 5. FIG. 6 illustrates the results obtained by using a thymine-free porous gel. FIG. 7 illustrates the results of the separation of a guanine derivative mixture obtained by using the thymine-containing porous gel.

It can readily be seen that the thymine-containing porous gel was excellent as a chromatography support.

Test 5

A reaction vessel was charged with adenine (50 parts), cross-linked porous polyglycidyl methacrylate (pore size of about 100 A) (35 parts) and N,N-dimethylformamide (300 parts). Anhydrous potassium carbonate (3 parts) was added thereto. The reaction and post treatment were carried out in the same manner as in Test 1. The introduction ratio was 45 mole % based on the number of epoxy groups in the starting gel.

Figure 8:
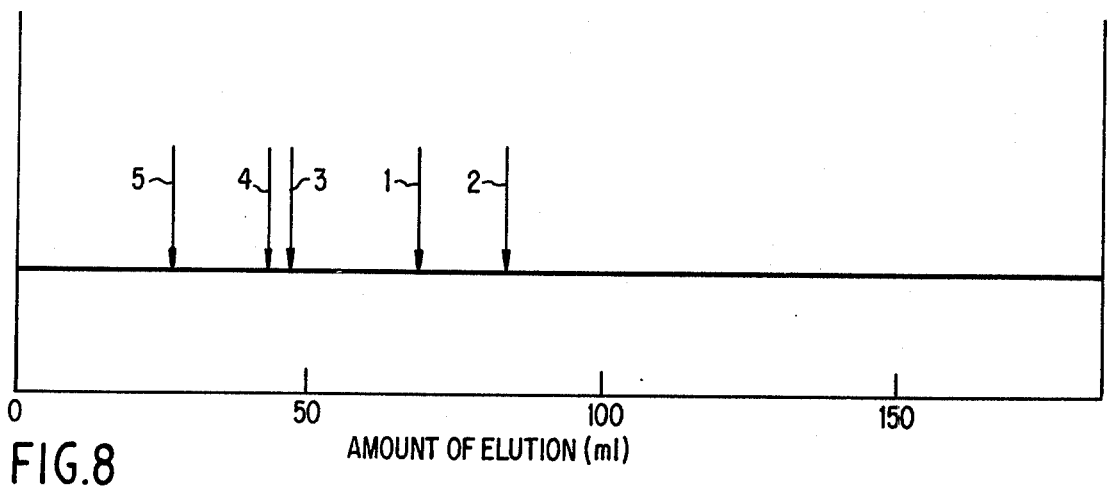
FIG. 8 illustrates the elution positions of nucleoside compounds in chromatography using a gel of the present invention.

By using the gel obtained, the nucleoside separating capacity was tested under the same conditions as in Example 1, obtaining the results shown in FIG. 8.

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A chromatography solid support prepared by reacting at a temperature of 50° to 200° C a nucleic acid base, a related compound thereof or a mixture thereof, selected from a group consisting of adenine, guanine, thymine, uracil, cytosine, theophylline, hypoxanthine, 6-mercaptopurine and 5-halopyrimidine, with an epoxy group-contaning porous gel having a pore size of less than 1mμ, a cross-linking density of 5 to 30 mole % and a gel size of 2 to 200 mμ, in a solvent in the presence of a carbonate, wherein the amount of said nucleic acid base is 0.4 to 3 equivalents relative to the number of epoxy groups in the porous gel, and the carbonate is present in an amount of 1 to 30 mole % based on the number of epoxy groups in the porous gel.

2. The chromatography solid support of claim 1 wherein said epoxy group-containing porous gel is selected from the group consisting of homopolymers and copolymers of the epoxy group containing monomers glycidyl methacryate, glycidyl acrylate, glycidyl allyl ether or 1,2-epoxystyrene; copolymers of said monomers with styrene, substituted styrenes, acrylic acid, methacrylic acid, esters of said acids, acrylonitrile, substituted acrylonitriles; and copolymers comprising at least one of said epoxy group-containing monomers and at least one monomer containing at least two unsaturated groups.

3. The chromatography solid support of claim 2 wherein said substituted styrene is methylstyrene and said substituted acrylonitrile is methacrylonitrile.

4. The chromatography solid support of claim 1 wherein said epoxy group-containing gel is formed on silica gel or alumina.

5. The chromatography solid support of claim 1 wherein said gel has a pore size is 10 – 2000 A.

6. The chromatography solid support of claim 1 wherein said carbonate is sodium carbonate or potassium carbonate.

7. The chromatography solid support of claim 1 wherein said solvent is N,N-dimethylformamide, N,N-dimethylacetamide, N,N-dimethylsulfoxide or a mixture thereof.

8. A method of preparing a chromatography solid support which comprises reacting at a temperature of 50° to 200° C a nucleic acid base, a related compound thereof or a mixture thereof, selected from a group consisting of adenine, guanine, thymine, uracil, cytosine, theophylline, hypoxanthine, 6-mercaptopurine and 5-halopyrimidine, with an epoxy group-containing porous gel having a pore size of less than 1mμ, a cross-linking density of 5 to 30 mole % and a gel size of 2 to 200 mμ, in a solvent in the presence of a carbonate, wherein the amount of said nucleic acid base is 0.4 to 3 equivalents relative to the number of epoxy groups in the porous gel, and the carbonate is present in an amount of 1 to 30 mole % based on the number of epoxy groups in the porous gel.

9. A method of introducing a nucleic acid base into an epoxy-containing porous gel which comprises reacting a nucleic acid base, a related compound thereof or a mixture thereof, selected from a group consisting of adenine, guanine, thymine, uracil, cytosine, theophylline, hypoxanthine, 6-mercaptopurine and 5-halopyrimidine, with an epoxy group-containing porous gel having a pore size of less than 1mμ, a cross-linking density of 5 to 30 mole % and a gel size of 2 to 200 mμ, in a solvent in the presence of a carbonate, wherein the amount of said nucleic acid base is 0.4 to 3 equivalents relative to the number of epoxy groups in the porous gel, and the carbonate is present in an amount of 1 to 30 mole % based on the number of epoxy groups in the porous gel.

* * * * *